United States Patent [19]

Komatsu

[11] Patent Number: 4,706,513
[45] Date of Patent: Nov. 17, 1987

[54] RACK AND PINION POWER STEERING APPARATUS

[75] Inventor: Shinichi Komatsu, Hatano, Japan

[73] Assignee: Atsugi Motor Parts Company Limited, Japan

[21] Appl. No.: 775,444

[22] Filed: Sep. 12, 1985

[30] Foreign Application Priority Data

Sep. 13, 1984 [JP]  Japan .................. 59-139018[U]

[51] Int. Cl.⁴ .............................................. B62D 3/12
[52] U.S. Cl. ........................................ 74/422; 74/498; 92/191
[58] Field of Search ................... 92/189, 190, 191; 403/41, 42, 257, 258, 260; 74/422, 498; 411/436, 367; 280/96; 180/148

[56] References Cited

U.S. PATENT DOCUMENTS

| 646,770 | 4/1900 | Thornton | 92/191 |
| 2,651,530 | 9/1953 | Blydenburgh | 403/258 |
| 3,025,363 | 3/1962 | Bakke | 403/258 |
| 3,153,858 | 10/1964 | Noack | 74/422 |
| 3,208,302 | 9/1965 | Lewis et al. | 403/258 X |
| 3,210,892 | 10/1965 | Derham | 403/258 |
| 4,522,419 | 6/1985 | Yoshida et al. | 74/422 X |

Primary Examiner—Richard J. Scanlan, Jr.
Assistant Examiner—Joseph A. Fischetti
Attorney, Agent, or Firm—Bachman & LaPointe

[57] ABSTRACT

In a rack and pinion power steering apparatus including a hydraulic cylinder housing, a pinion, a rack, a piston, a bolt for mounting the piston to the rack, etc., the rack is formed at one end thereof with a boss portion having a threaded portion which is formed with large inner diameter cylindrical cavity between the boss portion and the bolt in such a way that the female thread extends from a position radially corresponding to near the middle of the boss axial length or near the end surface of the rack to the bottom of the threaded portion. Therefore, it is possible to concentrate a load applied to the piston due to difference in pressure between two chambers to the relatively thick rack, not to the relatively thin boss portion, thus improving the mechanical strength of the steering apparatus without increasing the size or volume thereof.

5 Claims, 4 Drawing Figures and pinion power steering apparatus for automotive vehicles, and more particularly to a structure for loosely fitting a hydraulic annular piston to the end surface of a rack.

RACK AND PINION POWER STEERING APPARATUS

BACKGROUND OF THE INVENTION

1. Field of the Invention

The present invention relates generally to a rack and pinion power steering apparatus for automotive vehicles, and more particularly to a structure for loosely fitting a hydraulic annular piston to the end surface of a rack.

2. Description of the Prior Art

As is well known, power steering apparatuses have widely been incorporated in automotive vehicles for facilitating of vehicle steering. Usually, the power steering apparatus includes a control valve, a power cylinder and an oil pump including discharge and pressure control valves. A rack and pinion power steering apparatus is of one type of power steering apparatuses. In this rack and pinion type, a hydraulic piston connect to a rack for actuating a vehicle steering device is reciprocably moved within a hydraulic cylinder by the aid of hydraulic fluid. By the way, within the above hydraulic cylinder, since the piston must partition the inside space of the cylinder into two hydraulic fluid chambers, it is very important to stably maintain fluidtightness between the outer peripheral surface of the hydraulic piston and the inner peripheral surface of the hydraulic cylinder. For the above-mentioned purpose, there has been proposed a rack and pinion power steering apparatus such that the piston is elastically attached to the end of the rack in order to eliminate a harmful influence upon the fluidtightness due to misalignment between the piston and the rack within the cylinder. In this type of apparatus, however, since the annular piston is fixed to a boss portion formed at the end of the rack by caulking, the caulking work inevitably requires a skill in the assembly process of the piston and the rack.

To eliminate the above-mentioned skill, the same applicant has proposed a rack and pinion power steering apparatus such that the piston is elastically attached to the end of the rack by use of a bolt. In this apparatus, however, there still exists a problem in that: since the piston mounting bolt is screwed into only the boss portion of the rack, a load applied to the piston due to a difference in fluid pressure between two hydraulic chambers within the piston housing is concentratedly transmitted to the base of the small-diameter rack boss portion, thus the boss portion may be broken while the annular piston is slidably moved to and fro within the piston housing.

A more detailed description of the prior-art rack and pinion power steering apparatus will be made with reference to the attached drawings under DETAILED DESCRIPTION ON THE PREFERRED EMBODIMENT.

SUMMARY OF THE INVENTION

With these problems in mind, therefore, it is the primary object of the present invention to provide a rack and pinion power steering apparatus of such a structure that a load applied from the piston is transmitted to the relatively thick rack, not to the relatively thin boss portion of the rack, in order to increase the mechanical strength of the steering apparatus without increasing the size or volume of the apparatus.

To achieve the above-mentioned object, the rack and pinion power steering apparatus according to the present invention comprises: (a) an apparatus housing; (b) a pinion housed within said apparatus housing; (c) a rack housed within said apparatus housing so as to gear with said pinion, said rack being formed at one end thereof with a boss portion having a threaded portion which extends from a thread-start position X radially corresponding to near a middle of a boss axial length to a bottom of the threaded portion; (d) an inner elastic sealing member; (e) an outer elastic sealing member; (f) a piston elastically fitted to the boss portion of said rack through said inner elastic sealing member and into said apparatus housing through said outer elastic sealing member for partitioning an inside space of said apparatus housing into two hydraulic fluid chambers; and (g) a piston mounting bolt for loosely supporting said piston to the boss portion of said rack with an axial piston clearance within an annular space formed between said rack and said mounting bolt.

BRIEF DESCRIPTION OF THE DRAWINGS

The features and advantages of the rack and pinion power steering apparatus according to the present invention over the prior art apparatus will be more clearly appreciated from the following description of the preferred embodiment of the invention taken in conjunction with the accompanying drawings in which like reference numerals designate the same or similar elements or sections throughout the figures thereof and in which.

DETAILED DESCRIPTION OF THE PREFERRED EMBODIMENTS

To facilitate understanding to the present invention, a reference will be made to a prior-art rack and pinion power steering apparatus with reference to the attached drawings.

Figure 1:
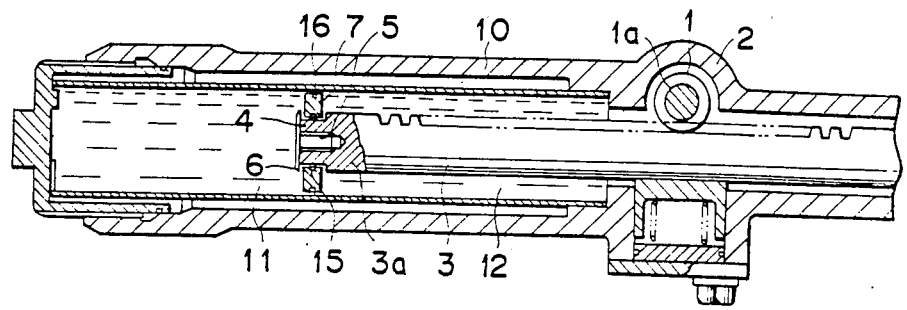
FIG. 1 is a diagrammatical longitudinal cross-sectional view, partly in side view, showing only the essential portion of a prior-art rack and pinion power steering apparatus related to the present invention.

In FIG. 1, the apparatus comprises a pinion shaft 1 rotatably disposed in position within a gear housing 2, a rack 3 driven by a pinion 1a fixed to the pinion shaft 1. The rack 3 is formed with a boss portion 4 at one end 3a of the rack 3. At this boss portion 4, there is formed a threaded hole 5 into which a piston mounting bolt 6 is screwed. The axis of the threaded hole 5 is aligned with the axis of the rack 3. An annular piston 7 is loosely fitted to the boss portion 4 of the rack 3 within a hydraulic cylinder 10 so as to partition the cylinder inside space into two fluid chambers 11 and 12 filled with hydraulic fluid. Further, the reference numeral 15 denotes an inner annular elastic sealing member; the reference numeral 16 denotes an outer annual elastic sealing member, both for sealing the fluid between piston and rack or between piston and cylinder.

Figure 2:
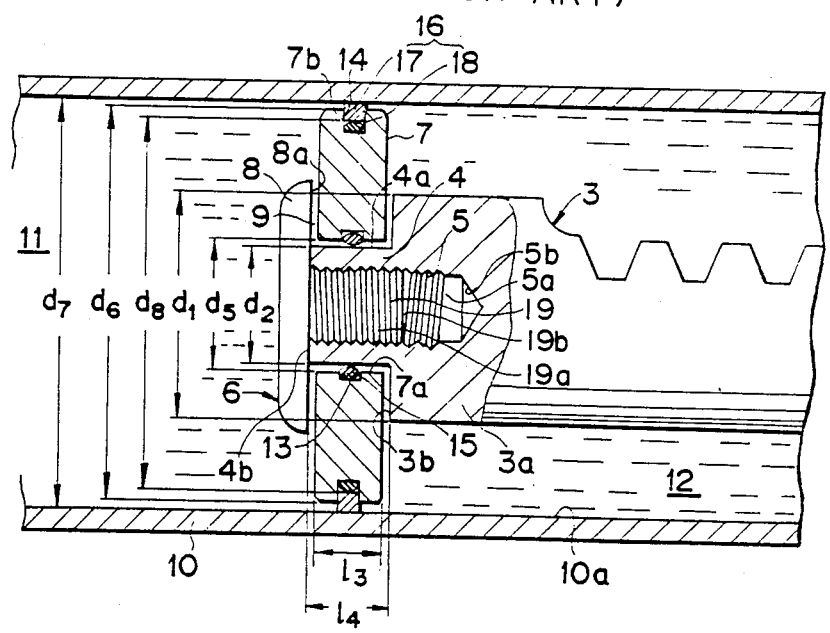
FIG. 2 is an enlarged diagrammatical longitudinal cross-sectional view, partly in side view, showing only a piston mounting bolt, an annular piston and an end of a rack housed within a hydraulic cylinder of the prior-art rack and pinion power steering apparatus shown in FIG. 1.

With reference to FIG. 2, the outer diameter $d_2$ of the rack boss portion 4 is smaller than that $d_1$ of the rack 3. The inner diameter $d_5$ of the annular piston 7 is larger and the outer diameter $d_2$ of the rack boss portion 4. Further, the longitudinal length $\lambda_3$ of the piston 7 is smaller than that $\lambda_4$ of the rack boss portion 4. Therefore, the annular piston 7 is loosely supported within an annular space formed between the lower surface $8a$ of the head 8 of the mounting bolt 6 and the end surface $3b$ of the boss portion 4 of the rack 3 with piston clearances both in the axial and radial directions of the rack 3.

The inner annual elastic sealing member (rubber seal ring) 15 is disposed within an inner annular groove 13 formed at the inner peripheral surface $7a$ of the piston 7; the outer annular elastic sealing member 16 is disposed within an outer annular groove 14 formed at the outer peripheral surface $7b$ of the piston 7. Further, the outer annular elastic sealing member 16 includes an outermost resin seal ring 17 made of a material (e.g. Trade Mark Teflon) having a small friction coefficient but a large wear resistance and an outer elastic rubber seal ring 18 made of a material having a good elasticity for enhancing sealing effect between the outermost resin seal ring 17 and the inner cylindrical surface $10a$ of the cylinder 10. The outer diameter $d_7$ of the outermost resin seal ring 17 is a little larger than that $d_6$ of the piston 7; the inner diameter $d_8$ of the outermost resin seal ring 17 is smaller than that $d_6$ of the piston 7. Therefore, the outer annular elastic sealing member 16 is fitted to the cylinder 10 in elastic pressure contact with the inner peripheral surface $10a$ of the cylinder 10 to seal fluid between piston 7 and cylinder 10. Further, the inner diameter of the outer elastic rubber seal ring 18 is smaller than the diameter of the outer annular groove 14 of the piston 7. The inner diameter of the inner elastic seal ring 15 is smaller than the diameter $d_2$ of the rack boss portion 4. Therefore, the inner annular elastic sealing member 15 is fitted to the rack boss portion $3a$ in elastic pressure contact with the outer peripheral surface $4a$ of the rack boss portion 4 to seal fluid between the piston 7 and the rack 3.

In the above-mentioned rack and pinion power steering apparatus, the assembly procedure is simple as follows: first the inner and outer annular elastic sealing members 15 and 16 are fitted to the inner and outer annular grooves 13 and 14 of the piston 7, respectively; secondly the piston 7 is fitted to the boss portion 4 of the rack 3; thirdly the bolt 6 is screwed into the threaded hole 5 of the rack boss portion 4. Since the annular piston 7 is elastically fitted to the rack 3 by use of two annular elastic sealing members 15 and 16, it is possible to fluidtightly partition the cylinder inside space into two hydraulic fluid chambers 11 and 12 by the piston 7, while preventing a part of the outer peripheral surface $7b$ of the piston 7 from being brought into point contact with the inner peripheral surface $10a$ of the cylinder. The above point contact of the piston 7 may be caused when the piston 7, the rack 3 and the cylinder 10 are not accurately aligned on the same axis or when the rack 3 is not accurately straight.

In the prior-art rack and pinion power steering apparatus, however, there still exist shortcomings. The basic problems are: the piston mounting bolt 6 is screwed into only the boss portion 4 of the rack 3. In more detail, the female thread $5a$ of the threaded hole 5 is formed extending from the end surface $4b$ of the boss portion 4 to the bottom of the threaded portion as shown in FIG. 2. Further, the axial length of the male thread $19a$ of the piston mounting bolt 6 is roughly equal to the boss axial length $\lambda_4$. Therefore, when the annular piston 7 is moved to and fro within the cylinder 10, a load applied to the piston 7 due to a difference in fluid pressure between two hydraulic fluid chambers 11 and 12 is first transmitted to the mounting bolt 6, and the boss portion 4 of the rack 3 via the mated portion of two male and female threaded portions $19a$ and $5a$, and lastly to the rack 3. Under these conditions, the total load is concentratedly applied to the base of the rack boss portion 4 having an outer diameter $d_2$ fairly smaller than that $d_1$ of the rack 3 or near the lower end $19b$ of the mounting bolt 6, thus resulting in a problem such that the mechanical strength of the boss portion 4 is not sufficient and therefore the boss portion 4 may be broken while the annular piston 7 is slidably moved to and fro within the piston cylinder 10.

In view of the above description, reference is now made to an embodiment of the rack and pinion power steering apparatus according to the present invention, with reference to the attached drawings.

Figure 3:
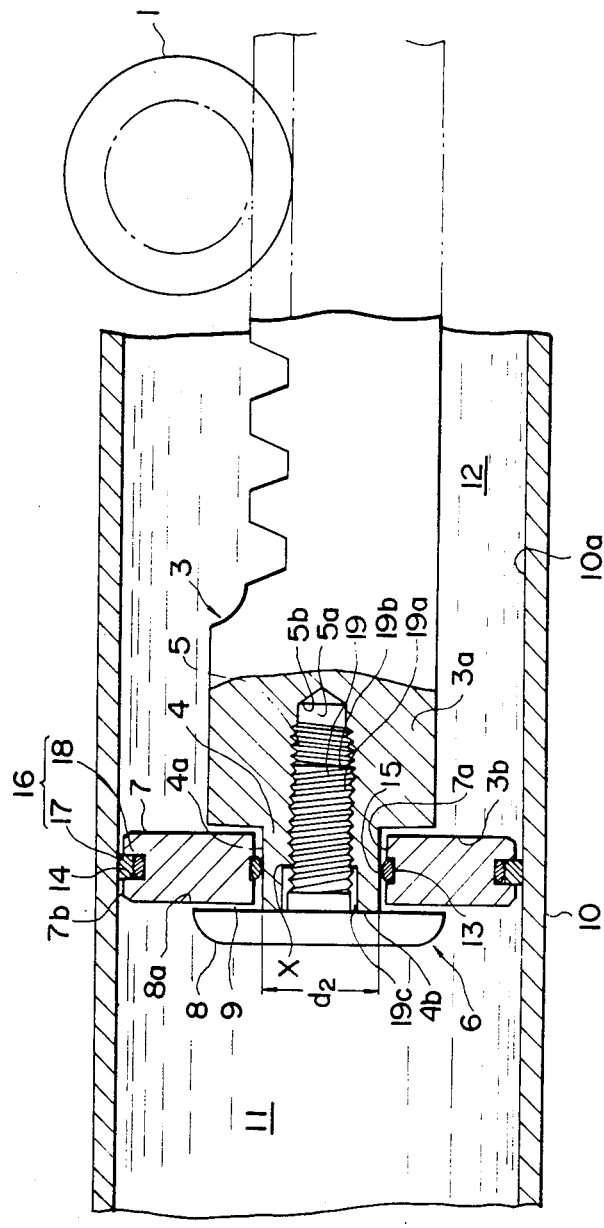
FIG. 3 is an enlarged diagrammatical longitudinal cross-sectional view showing only a piston mounting bolt, an annular piston and an end of a rack housed within a hydraulic cylinder of the preferred embodiment of the rack and pinion power steering apparatus according to the present invention.
Figure 4:
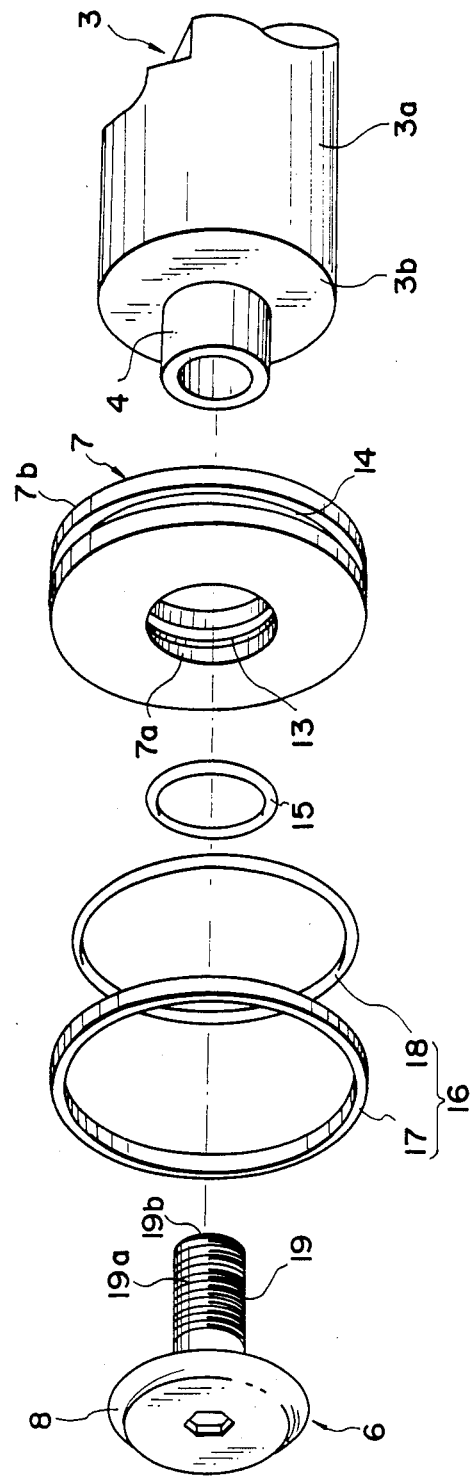
FIG. 4 is an enlarged exploded view showing only the annular piston, the end of the rack, an outermost resin seal ring, inner and outer elastic rubber seal rings and a piston mounting bolt of the rack and pinion power steering apparatus shown in FIG. 3.

In FIGS. 3 and 4, the embodiment is the same in structure as the prior-art power steering apparatus shown in FIGS. 1 and 2 except the threaded hole 5 formed at the boss portion 4 of the rack 3. The same references have been retained for similar parts which have the same functions.

In the embodiment shown in FIGS. 3 and 4, the threaded hole 5 is formed with a large inner diameter cylindrical cavity $19c$ extending from the extreme end surface $4b$ of the boss portion 4 to a position X radially corresponding to a middle of the axial length $\lambda_4$ (shown in FIG. 2) of the boss portion 4 of the rack 3. That is, the female thread $5a$ formed in the inner peripheral surface of the threaded hole 5 starts from the above position X to the bottom thereof. Therefore, the female thread $5a$ engages with the male thread $19a$ formed in the outer peripheral surface of the thread body 19 of the piston mounting bolt 6 between the middle point X of the boss axial length $\lambda_4$ and the lower end (the extreme right side in FIG. 3) $19b$ of the piston mounting bolt 6.

Therefore, when the annular piston 7 is slidably moved to and fro within the cylinder 10 due to a difference in the piston cylinder 10 between two hydraulic chambers 11 and 12, the hydraulic pressure applied to the annular piston 7 within the cylinder 10 is mainly transmitted from the mounting bolt 6 to the rack 3 by way of the engagement area between the male and female thread portions $19a$ and $5a$ without being transmitted by way of the boss portion 4. In other words, the position at which the above-mentioned load is applied is not the boss portion 4 having a small outer diameter $d_2$ but the engagement area between the male and female portions $19a$ and $5a$, in particular, the lower end position $19b$ of the mounting bolt 6 or the position near the bottom $15b$ of the threaded hole 5. At the lower end position $19b$ of the bolt 6, since the rack 3 is relatively thick, there exists no problem such that the boss portion 4 may be broken while the annular piston 7 is slidably moved to and fro within the annular piston cylinder 10.

Further, in the above embodiment, although the large inner diameter cylindrical cavity $19c$ extends from the end surface 4b of the boss portion 4 to the position X radially corresponding to near the middle of the boss axial length λ₄, that is, the female thread 5a is formed within the threaded hole 5 beginning from the middle position X of the boss axial length to the bottom 5b of the threaded hole 5, it is also preferable to form the large inner diameter cylindrical cavity 19c extending throughout the axial length of the boss portion 4, that is, from the end surface 4b of the boss portion 4 to the position radially corresponding to the end surface 3b of the rack 3. In this case, the female thread 5a is formed beginning from the position radially corresponding to the end surface 3b of the rack 3 to the bottom end 5b of the threaded hole 5. In this embodiment, since a load applied to the mounting bolt 6 is directly received by the rack 3 having a thick wall without dependence upon the boss portion, it is possible to further increase the mechanical strength of the apparatus.

The structural features and functional effects of the embodiment other than those described above are substantially the same as is the case with the prior-art steering apparatus previously described with reference to FIGS. 1 and 2 and any other detailed description of them is believed to be unnecessary.

Further, in the above embodiment, the piston 7 is formed in annular shape and is sealed by double annular sealing members. However, without being limited to the above embodiment, it is possible to form the piston 7 in any other forms and to seal the piston 7 by a single non-annular sealing member.

As described above, in the rack and pinion power steering apparatus according to the present invention, since the large inner diameter cylindrical cavity is formed in the threaded hole of the boss portion of the rack in order to engage the male thread of the mounting bolt with the female thread of the rack at only the area extending from near the middle of the boss axial length to the bottom of the threaded hole, it is possible to receive a load applied from the piston by the relatively thick rack portion, not by the relatively thin boss portion, thus improving the mechanical strength of the steering apparatus without increasing the size or volume thereof.

What is claimed is:

1. A rack and pinion power steering apparatus comprising:
    (a) a pinion;
    (b) a rack meshing with the pinion, one end of the rack having a base and a boss extending integrally from the base, the boss having a cross-sectional area smaller than a cross-sectional area of the base, the rack defining a hole which extends from an end face of the boss into the base through the boss and which terminates at a blind end in the base, the hole having a non-threaded first segment and a female-threaded second segment, the first segment extending in the boss and lying from the end face of the boss to a preset point axially away from the end face of the boss, the second segment extending from the preset point toward the blind end, a major part of the second segment extending in the base;
    (c) a piston loosely fitted to the boss to permit relative movement therebetween; and
    (d) a piston mounting bolt having a head and a male-threaded screw extending from the head, the screw extending in the hole, the screw extending into the base through the boss, the male thread of the screw engaging the female thread of the second segment of the hole, the bolt being secured to the rack by engagement between the threads, wherein a major component of a force transmitted between the bolt and the rack passes through the engaged threads in the base;
the bolt head, the rack boss, and the rack base defining a recess receiving a part of the piston.

2. The apparatus of claim 1, wherein a major part of engagement between the threads lies in the rack base.

3. The apparatus of claim 1, wherein the screw has an end located at a point in the rack base which is considerably remote from a boundary between the rack boss and the rack base.

4. The apparatus of claim 1, wherein the preset point between the first and second segments of the hole axially corresponds to near a middle of the boss so that the non-threaded first segment of the hole extends essentially between the end face of the boss and the middle of the boss.

5. The apparatus of claim 1, wherein the present point between the first and second segments of the hole axially corresponds to near a boundary between the rack boss and the rack base so that the non-threaded first segment of the hole extends essentially through the boss and that essentially the entire of the threaded second segment of the hole lies in the rack base.

* * * * *